(12) United States Patent
Nishimura

(10) Patent No.: US 7,118,237 B2
(45) Date of Patent: Oct. 10, 2006

(54) APPARATUS FOR AUTOMATICALLY ADJUSTING DIRECTION OF LIGHT AXIS OF VEHICLE HEADLIGHT

(75) Inventor: Kenichi Nishimura, Gifu (JP)

(73) Assignee: Denso Corporation, Aichi-Pref. (JP)

(*) Notice: Subject to any disclaimer, the term of this patent is extended or adjusted under 35 U.S.C. 154(b) by 28 days.

(21) Appl. No.: 10/926,276

(22) Filed: Aug. 26, 2004

(65) Prior Publication Data
US 2005/0047113 A1   Mar. 3, 2005

(30) Foreign Application Priority Data
Aug. 28, 2003  (JP)  ............................. 2003-304767
May 28, 2004  (JP)  ............................. 2004-158583

(51) Int. Cl.
*B60Q 1/64*   (2006.01)
*B60Q 1/76*   (2006.01)

(52) U.S. Cl. ........................................ 362/37; 362/466

(58) Field of Classification Search ................ 362/37, 362/465, 466, 512, 513, 523, 538, 277, 284, 362/282, 420, 418, 428, 464; 315/79, 81, 315/82
See application file for complete search history.

(56) References Cited

U.S. PATENT DOCUMENTS 5,588,733 A * 12/1996 Gotou ........................ 362/37
5,877,680 A * 3/1999 Okuchi et al. ............... 340/468
6,193,398 B1 * 2/2001 Okuchi et al. ............... 362/466
6,481,876 B1  11/2002 Hayami et al.
2002/0003473 A1  1/2002 Makita et al.

FOREIGN PATENT DOCUMENTS

| EP | 0965487 A3 | 10/2001 |
| JP | 02081776 A | 3/1990 |
| JP | 03042347 A | 2/1991 |
| JP | 07164960 A | 6/1995 |
| JP | 2000-142213 | 5/2000 |
| JP | 2002-19517 | 1/2002 |
| JP | 2002-234383 | 8/2002 |

* cited by examiner

*Primary Examiner*—Sandra O'Shea
*Assistant Examiner*—Sharon E. Payne
(74) *Attorney, Agent, or Firm*—Posz Law Group, PLC

(57) ABSTRACT

The apparatus for automatically adjusting a direction of a light axis of a vehicle headlight includes a steering angle sensor, a vehicle speed sensor, a memory for storing a plurality of control maps each of which defining a relationship between the steering angle and a swiveling angle, a processing unit for performing a map switchover by which one of the plurality of the control maps is selected depending on the vehicle speed and the steering angle, and an actuator for swiveling, from an initial direction, the light axis of the vehicle headlight by the swiveling angle defined by one of the plurality of control maps selected by the processing unit. The processing unit performs the map switchover when the steering angle is changed to outside a predetermined angular range around a neutral angular position of the steering wheel.

10 Claims, 7 Drawing Sheets

APPARATUS FOR AUTOMATICALLY ADJUSTING DIRECTION OF LIGHT AXIS OF VEHICLE HEADLIGHT

BACKGROUND OF THE INVENTION

1. Field of the Invention

The present invention relates to an apparatus for automatically adjusting a light axis or lighting area of a light beam emitted from a vehicle headlight in the horizontal direction on the basis of a steering angle.

2. Description of the Background Art

Such an apparatus of the type as mentioned above is disclosed, for example, in Japanese Patent Application Laid Open Nos. 2002-19517 and 2002-234383.

The former document discloses a technique for emitting a light beam in a specific light distribution pattern depending on a vehicle's running state from a headlight including a lamp body and a lighting unit disposed within the lamp body. More specifically, the light distribution pattern can be varied depending on not only a speed of an instant vehicle but a distance from another vehicle ahead of the instant vehicle. The latter document describes a technique for varying a width and a direction of a light beam emitted from a headlight depending on a vehicle speed, a vehicle height, etc. in order to perform headlight illumination best suited to a vehicle's running state.

Conventionally, a plurality of control maps whose parameters are a steering angle and a vehicle speed have been used to determine a controlled variable (an amount of control) for adjusting the direction of the light axis of the vehicle headlight on the basis of the steering angle and the vehicle speed. However, the prior art systems using such control maps have a problem in that, when a control map currently used is switched to another control map as a consequence of a change in the vehicle speed, the direction of the light axis of headlight may change abruptly because of the difference between the controlled variables which these two different control maps define, respectively. Such an abrupt change in the direction of the light axis of the headlight often causes the driver to feel awkwardness in the control of the light distribution pattern or light beam pattern.

SUMMARY OF THE INVENTION

The present invention has been made in light of such a problem with an object of providing an apparatus for automatically adjusting a light axis of a vehicle headlight, this apparatus using a plurality of control maps, whose parameters are a steering angle and a vehicle speed, to determine a control amount on the basis of the steering angle and the vehicle speed, and being capable of avoiding the abrupt change in the direction of the light axis of the headlight occurring in the prior art at the time of switching the control maps.

In one aspect of the invention, the apparatus for automatically adjusting a direction of a light axis of a vehicle headlight has a structure including:

a steering angle sensor for detecting a steering angle of a steering wheel of a vehicle;

a vehicle speed sensor for detecting a vehicle speed of the vehicle;

a memory for storing a plurality of control maps each of which defining a relationship between the steering angle and a swiveling angle;

a processing unit for performing a map switchover by which one of the plurality of the control maps is selected depending on the vehicle speed detected by the vehicle speed sensor and the steering angle detected by the steering angle sensor; and an actuator for swiveling, from an initial direction, the light axis of the vehicle headlight by the swiveling angle defined by one of the plurality of control maps selected by the processing unit;

wherein the processing unit performs the map switchover when the steering angle is changed to outside a predetermined angular range around a neutral angular position of the steering wheel.

With this structure, it becomes possible to avoid the driver from feeling awkwardness in the control of the light beam patterns, since the directions of the light axes of the headlights do not change abruptly even if the map switchover is performed as a result of the change in the vehicle speed while the vehicle is turning.

The angular range may be constant irrespective of the vehicle speed. In this case, when the vehicle speed is changed, the driver can switch the currently used control map to another control map suitable for the changed vehicle speed by always moving back the steering wheel to a certain position.

The angular range may be increased as the vehicle speed increases, since the steering angle of the steering wheel becomes smaller as the vehicle speed increases under normal driving conditions.

When the headlight is turned on while the steering angle is beyond the angular range, the processing unit may prohibit the actuator from swiveling the light axis of the vehicle headlight until the steering angle is changed to within the predetermined angular range. In this case, it becomes possible to avoid the direction of the light axis of the headlight from changing abruptly after turning on the headlight.

The angular range may overlap with a dead zone within which the swiveling angle is set at zero. Alternatively, the angular range may overlap with a range within which the swiveling angle is set at values smaller than a predetermined threshold, The angular range may be symmetrical or asymmetrical with respect to the neutral angular position.

In another aspect of the invention, the apparatus for automatically adjusting a direction of a light axis of a vehicle headlight has a structure including:

a steering angle sensor for detecting a steering angle of a steering wheel of a vehicle;

a vehicle speed sensor for detecting a vehicle speed of the vehicle;

a memory for storing a plurality of control maps each of which defining a relationship between the steering angle and a swiveling angle;

a processing unit for performing a map switchover by which one of the plurality of the control maps is selected depending on the vehicle speed detected by the vehicle speed sensor and the steering angle detected by the steering angle sensor; and an actuator for swiveling, from an initial direction, the light axis of the vehicle headlight by the swiveling angle defined by one of the plurality of control maps selected by the processing unit;

wherein the processing unit performs one of a smoothing process on the swiveling angle to be outputted to the actuator, a filtering process on the swiveling angle to be outputted to the actuator, and a delaying process on the steering angle detected by the steering angle sensor so that the swiveling angle outputted to the actuator changes gradually when the map switchover is performed by the processing unit.

With this structure, it becomes possible to avoid the driver from feeling awkwardness in the control of the light beam patterns when the vehicle is turning, since the swiveling angle changes only gradually even if the map changeover is performed as a result of change in the vehicle speed while the vehicle is turning, and so the directions of the light axes of the headlights do not change abruptly while the vehicle is turning.

In still another aspect of the invention, the apparatus for automatically adjusting a direction of a light axis of a vehicle headlight has a structure including:

a steering angle sensor for detecting a steering angle of a steering wheel of a vehicle;

a vehicle speed sensor for detecting a vehicle speed of the vehicle;

a memory for storing a plurality of control maps each of which defining a relationship between the steering angle and a swiveling angle;

a processing unit for performing a map switchover by which one of the plurality of the control maps is selected depending on the vehicle speed detected by the vehicle speed sensor and the steering angle detected by the steering angle sensor; and an actuator for swiveling, from an initial direction, the light axis of the vehicle headlight by the swiveling angle defined by one of the plurality of control maps selected by the processing unit;

wherein the processing unit, when performing the map switchover to shift the swiveling angle from a first value determined on the basis of one of the plurality of control maps having been used before the map switchover to a second value determined on the basis of one of the plurality of control maps to be used after the map switchover, temporarily sets the swiveling angle at a third value between the first value and the second value.

With this structure, it becomes possible to avoid the driver from feeling awkwardness in the control of the light beam patterns, since the directions of the light axes of the headlights do not change abruptly even if the map switchover is performed as a result of the change in the vehicle speed while the vehicle is turning.

PREFERRED EMBODIMENTS OF THE INVENTION

Figure 1:
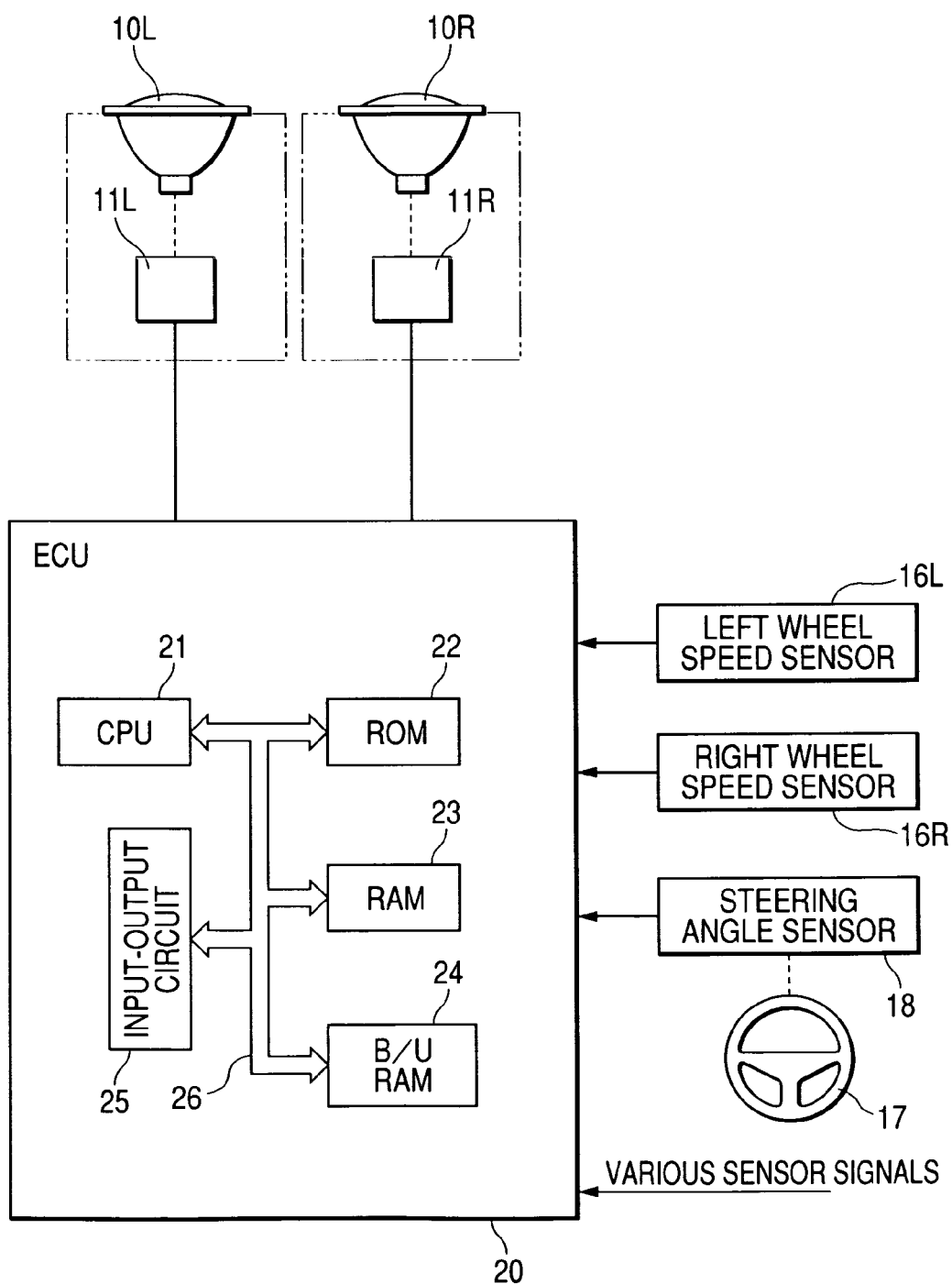
FIG. 1 is a schematic view showing an overall structure of an apparatus for automatically adjusting a direction of a light axis of a vehicle headlight according to a first embodiment of the invention.

FIG. 1 shows an overall structure of an apparatus for automatically adjusting a direction of a light axis of a vehicle headlight according to a first embodiment of the invention.

In this drawing, 10L and 10R denote left and right vehicle headlights, respectively. The headlights 10L and 10R are linked to actuators 11L and 11R for adjusting the light axes of the headlights 10L and 10R in the horizontal direction.

An ECU (Electronic Control Unit) includes a CPU 21 for executing various processings, a ROM 22 for storing control programs, control maps, etc., a RAM 23 for temporarily storing various data, a B/U (Back Up) RAM 24, an input-output circuit 25, and a bus line 26 for connecting these elements.

The ECU 20 receives an output signal from a left wheel speed sensor 16L detecting a left wheel speed VL, an output signal from a right wheel speed sensor 16R detecting a right wheel speed VR, an output signal from a steering angle sensor 18 detecting a steering angle $\theta$ of a steering wheel 17, and output signals from other various sensors, not illustrated.

The actuators 11L and 11R act to horizontally adjust the directions of the light axes of the headlights 10L and 10R on the basis of output signals of the ECU 20.

Figure 2:
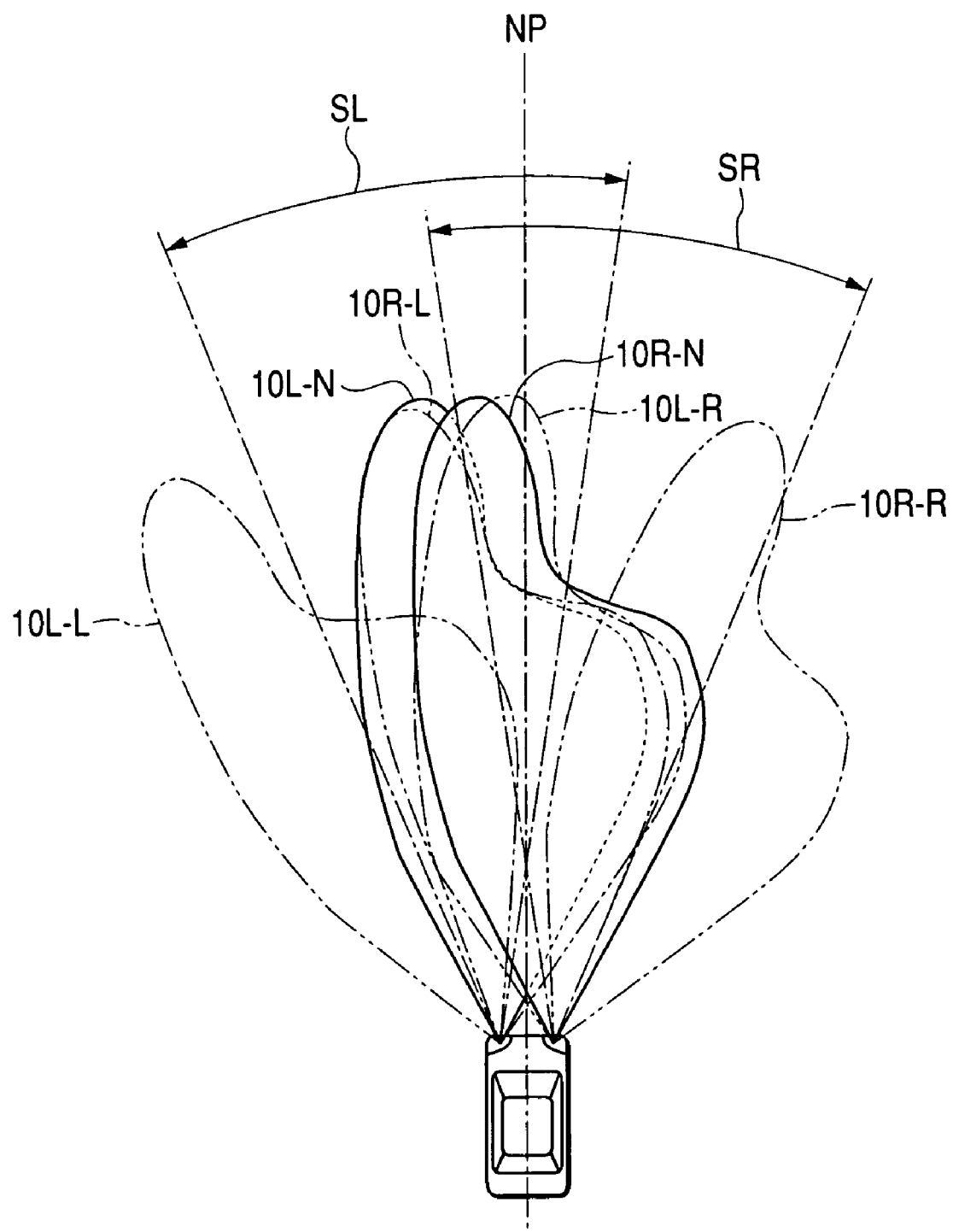
FIG. 2 is an explanatory view for explaining beam patterns of the headlights adjusted by the apparatus according to the first embodiment.

FIG. 2 shows beam patterns of the headlights 10R and 10L (low beam). In this figure, the heavy solid line 10L-N represents a beam pattern of the headlight 10L when the steering wheel 17 is in its neutral angular position (indicated by NP in FIG. 2) and the light axis of the headlight 10L is therefore in alignment with its initial direction. The arcuate arrow SL represents a swivel range within which the light axis of the headlight 10L can be swiveled in accordance with the steering angle of the steering wheel 17. The chain double-dashed lines 10L-R and 10L-L represent beam patterns of the headlight 10L when the steering wheel 17 is fully turned to the right and left, respectively. The heavy solid line 10R-N represents a beam pattern of the headlight 10R when the steering wheel 17 is in the neutral angular position and the light axis of the headlight 10R is therefore in alignment with its initial direction. The arcuate arrow SR represents a swivel range within which the light axis of the headlight 10R can be swiveled in accordance with the steering angle of the steering wheel 17. The chain double-dashed lines 10R-R and 10R-L represent beam patterns of the headlight 10R when the steering wheel 17 is fully turned to the right and left, respectively. The swivel ranges SL and SR should provide the driver with a good visibility in the leftward or rightward direction when the driver turns the steering wheel 17 to the left or right without a sacrifice of visibility in the forward direction. Accordingly, as shown in FIG. 2, a portion of the swivel range SR at the right of the initial position NP is wider than that of the swivel range SL so that the angular displacement of the light axis of the headlight 10R is larger than that of the headlight 10L when the driver turns the steering wheel 17 to the right. On the other hand, a portion of the swivel range SL at the left of the initial position NP is wider than that of the swivel range SR so that the angular displacement of the light axis of the headlight 10L is larger than that of the headlight 10R when the driver turns the steering wheel 17 to the left.

Next, the swivel control routine performed by the CPU 21 of the ECU 20 will be explained with reference to the flowchart shown in FIG. 3, the map view shown in FIG. 4, and the control curves defining relationships between the swiveling angle and the steering angle shown in FIG. 5. The CPU 21 performs this swivel control routine at regular intervals.

Figure 4:
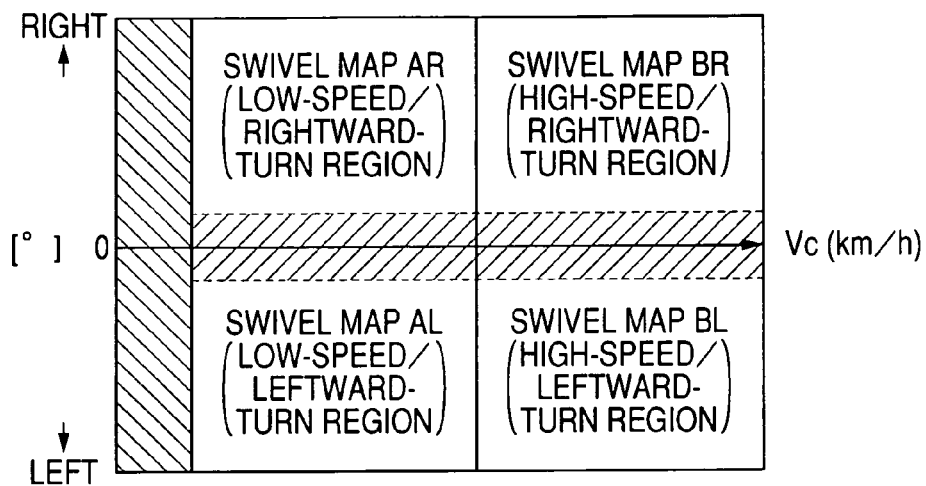
FIG. 4 is a map view showing swivel control maps whose parameters are a vehicle speed and a steering angle, which are used in the apparatus according to the first embodiment.

In FIG. 4, AL denotes a swivel control map for a low-speed/leftward-turn region, AR denotes a swivel control map for a low-speed/rightward-turn region, BL denotes a swivel control map for a high-speed/leftward-turn region, and BR denotes a swivel control map for a high-speed/rightward-turn region. The hatched portion in FIG. 4 represents a map-switchover-enabling range (explained hereinafter) and a standing region (explained hereinafter). One of these swivel control maps is selected depending on the vehicle speed Vc (km/h) and the steering angle θ (degree). Although, in this embodiment, the vehicle speed Vc is classified into three levels corresponding to the high-speed regions, low-speed regions, and standing region for performing the map changeover, medium-speed regions may be added.

The angle by which the light axis of the headlight 10L or 10R should be swiveled depending on the steering angle that is the swiveling angle SWc are determined on the basis of the control curves (AL, BL, AR, BR) shown in FIG. 5 as explained below. The swiveling angle SWc is set at zero irrespective of the steering angle θ when the vehicle is standing.

Figure 3:
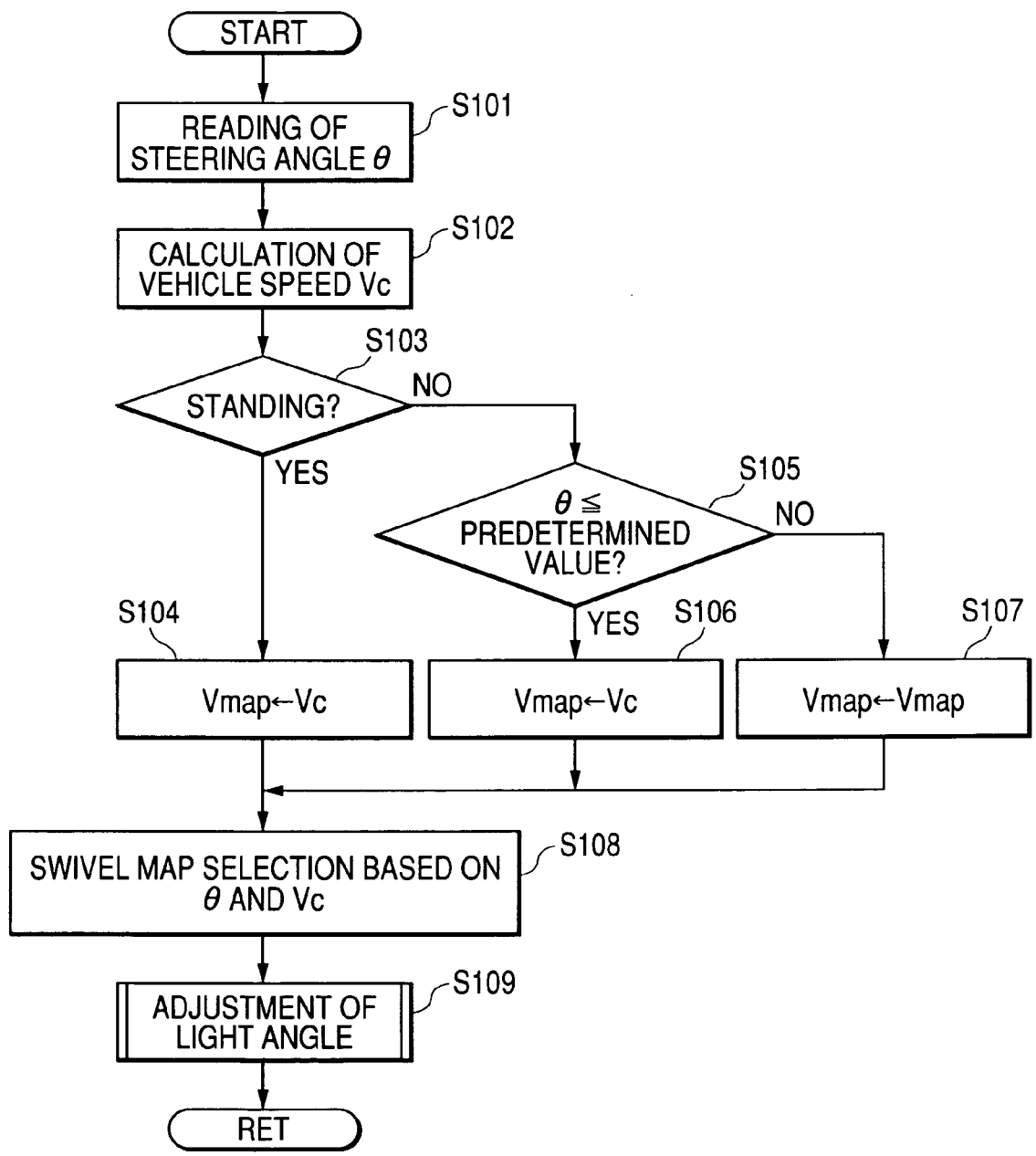
FIG. 3 is a flowchart for explaining the swivel control routine performed by a CPU within an ECU included in the apparatus according to the first embodiment.

As shown in the flowchart of FIG. 3, the steering angle θ detected by the steering angle sensor 18 is read at step S101. Subsequently, the vehicle speed Vc is calculated on the basis of the left wheel speed VL detected by the left wheel speed sensor 16L and the right wheel speed VR detected by the right wheel speed sensor 16R at step S102. The steering angle θ is an angle by which the steering wheel 17 is turned from its neutral angular position, or straight-ahead position.

Next, it is determined whether or not the vehicle is standing at step S103. Here, "standing" means "stopped" or "running at a speed lower than 5 km/h". If it is determined that the vehicle is standing, then the process goes to step S104 where the detected vehicle speed Vc is read as an updated map-selecting speed Vmap. On the other hand, if it is determined that the vehicle is not standing, or the vehicle is running at a speed equal to or higher than 5 km/h at step S103, then the process goes to step s105 where it is determined whether or not the steering angle θ is within the map-switchover-enabling range. If it is determined that the steering angle θ is within the map-switchover-enabling range at step S105, then the processes goes to step S106 where the detected vehicle speed Vc is read as an updated map-selecting speed Vmap.

If it is determined that the steering angle θ is beyond the map-switchover-enabling range at step S105, then the processes goes to step S107 where the last used map-selecting speed Vmap is maintained without being updated. After that, the process goes, from step S104, step S106 or step S107, to step S108 where one of the swivel control maps AL, AR, BL, BR is selected on the basis of the steering angle θ and the map-selecting speed Vmap.

Next, the process goes to step S109 where the swiveling angle SWc is determined depending on the steering angle θ read at step S101 by referring to the control curve corresponding to the swivel control map selected at step S108. The actuators 11L, 11R adjust the light axes of the headlights 11L, 11R in the horizontal directions depending on the swiveling angle SWc to complete the swivel control routine. The swiveling angle SWc may be filtered by use of, for example, a high-cut filter in adjusting the directions of the light axes of the headlights 11L, 11R at step S105 as necessary.

As a matter of course, the above described swivel control is performed only when the headlights 10L and 10R are on. The CPU 21 prohibits the actuators 11L, 11R from swiveling the light axes of the headlights 10L, 10R when they are off. In a case where the headlights 10L and 10R are turned on while the vehicle turns left or right, the light axes of the headlights 10L and 10R continue to be in alignment with their initial directions corresponding to the neutral angular position of the steering wheel 17, as long as the steering angle θ is beyond the map-switchover-enabling range. In such a case, once the steering angle θ is changed to within the map-switchover-enabling range, the swivel control is initiated.

The swivel control in this embodiment is now explained in more detail below. Assume that the vehicle is turning left with the vehicle speed Vc being higher than 5 km/h, and the steering angle θ, which is beyond the map-switchover-enabling range, being kept at a constant value, and that the swivel control map AL (corresponding to the low-speed/leftward-turn region) is in use at this time.

During such a left turn, even if the vehicle speed Vc is increased, the swivel control map AL is not switched to the swivel control map BL as long as the steering angle θ keeps lying outside the map-switchover-enabling range. Therefore, any abrupt change does not occur in the swiveling angle SWc during the left turn. Accordingly, the light axes of the headlights 10L, 10R do not change abruptly, and so the driver does not feel the awkwardness during the left turn unlike prior art.

When the left turn is finished, and the steering wheel 17 is moved back so that the steering angle θ is within the map-switchover-enabling range, the map-selecting speed Vmap is updated to the vehicle speed Vc at that time. At the time of making a left or right turn thereafter, the directions of the light axes of the headlights 10L, 10R are adjusted in accordance with the swiveling angle SWc which the swivel control map having been selected on the basis of the updated map-selecting speed Vmap determines on the basis of the steering angle θ at that time.

Likewise, when the vehicle speed Vc is reduced during such a left (or right) turn, the swivel control map is not switched until the steering wheel 17 is moved back so that the steering angle θ is within the map-switchover-enabling range. In a case where the vehicle is standing, and the steering angle θ is beyond the map-switchover-enabling range, the swivel control is not performed until the steering wheel 17 is moved back so that the steering angle θ is within the map-switchover-enabling range.

As explained above, the apparatus for automatically adjusting the direction of a light axis of a vehicle headlight according to the first embodiment has a structure including:

a steering angle sensor for detecting a steering angle of a steering wheel of a vehicle;

a vehicle speed sensor for detecting a vehicle speed of the vehicle;

a memory for storing a plurality of-control maps each of which defining a relationship between the steering angle and a swiveling angle;

a processing unit for performing a map switchover by which one of the plurality of the control maps is selected depending on the vehicle speed detected by the vehicle speed sensor and the steering angle detected by the steering angle sensor; and an actuator for swiveling, from an initial direction, the light axis of the vehicle headlight by the swiveling angle defined by one of the plurality of control maps selected by the processing unit.

In the apparatus, the processing unit performs the map switchover when the steering angle is changed to outside a predetermined angular range around an neutral angular position of the steering wheel.

In this embodiment, to switch the swivel control map currently used to another swivel control map with the change of the vehicle speed Vc, the steering angle θ detected by the steering angle sensor 18 must go through the map-switchover-enabling range around the neutral angular position of the steering wheel 17. The directions of the light axes of the headlights 10L, 10R are adjusted horizontally in accordance with the steering control angle SWc determined by use of the last selected swivel control map which defines the relationship between the steering control axis SWc and the steering angle θ.

Accordingly, while the vehicle is turning left or right with the steering angle θ lying outside the map-switchover-enabling range, even if the vehicle speed Vc is changed, the swivel control map is not switched until the left or right turn is finished and the steering angle θ goes into the map-switchover-enabling range. Thus, it becomes possible to avoid the driver from feeling awkwardness in the control of the light beam patterns, since the directions of the light axes of the headlights 10L, 10R do not change abruptly while the vehicle is turning.

In this embodiment, the width of the map-switchover-enabling range is constant and independent of the vehicle speed Vc. Accordingly, when the vehicle speed Vc is changed, the currently used swivel control map is switched to another map suitable for the changed vehicle speed Vc whenever the steering wheel 17 is moved back to a certain position.

Although the width of the map-switchover-enabling range is kept constant and is independent of the vehicle speed Vc in the first embodiment, the width of the map-switchover-enabling range may be varied depending on the vehicle speed Vc. More specifically, the map-switchover-enabling range around the neutral angular position may become narrower as the vehicle speed Vc increases, this is because the steering angle θ of the steering wheel 17 becomes smaller as the vehicle speed Vc increases under normal driving conditions.

Figure 5:
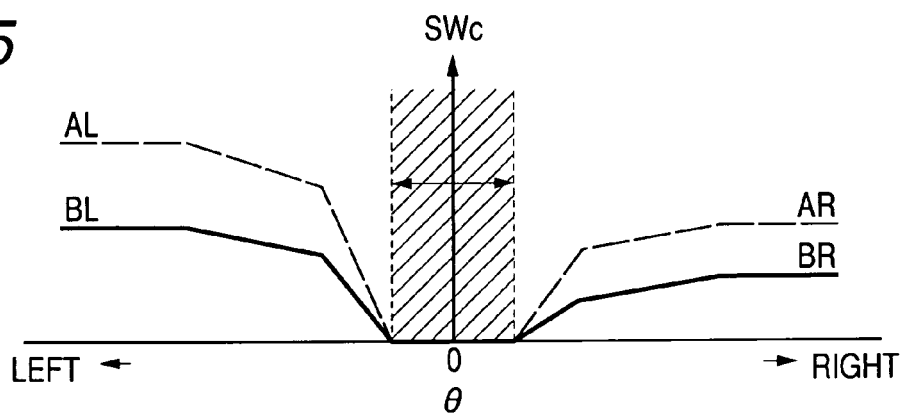
FIG. 5 is a graph showing control curves corresponding to the swivel control maps shown in FIG. 4, each of which defining relationship between the swiveling angle and the steering angle.
Figure 6:
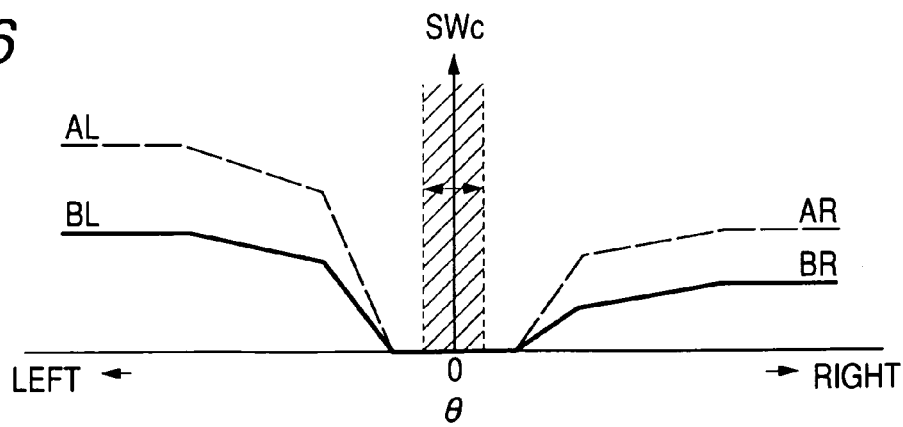
FIG. 6 is a graph showing a variant of the control curves shown in FIG. 5.

Furthermore, as shown in FIG. 5, the map-switchover-enabling range overlaps completely with the dead zone within which the swiveling angle is set at zero in the first embodiment, however, the present invention should not be construed as being limited thereto. For example, the map-switchover-enabling range may be narrower than the dead zone as far as the driver does not feel awkwardness in the control of the light beam patterns.

Figure 7:
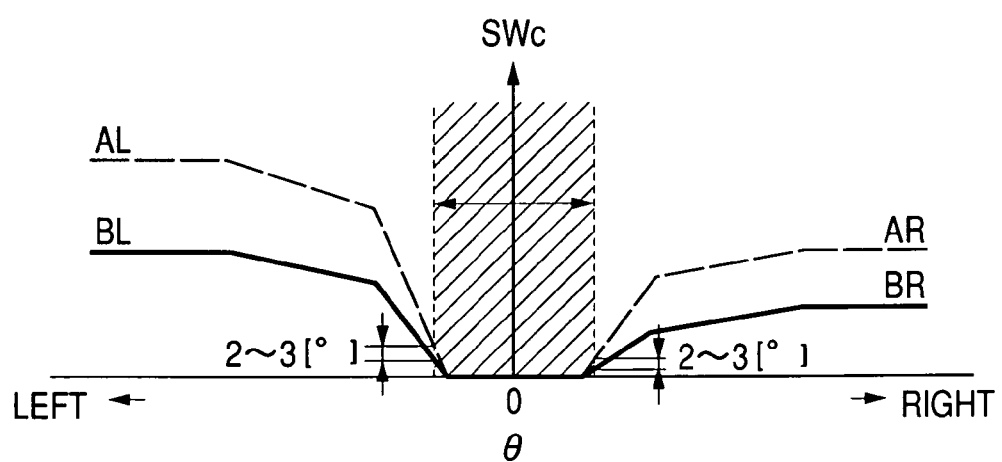
FIG. 7 is a graph showing another variant of the control curves shown in FIG. 5.

Alternatively, the map-switchover-enabling range may be wider than the dead zone as far as the driver does not feel awkwardness in the control of the light beam patterns. FIG. 7 shows a case where the map-switchover-enabling range spreads over the whole of an area within which the steering angel θ is set at values smaller than 2 (or 3) degrees. The advantageous effects of the first embodiment can be obtained as well in such a case, because the variation of the swiveling angle SWc at the time of the map switchover is small compared to the prior art.

Furthermore, although the map-switchover-enabling range is symmetrical with respect to the neutral angular position, it may be asymmetrical with respect to the neutral angular position.

Second Embodiment

The first embodiment is configured to perform the map switchover after the steering angle θ goes through the map-switchover-enabling range around the neutral angular position for the purpose of avoiding the abrupt change in the swiveling angle SWc, which results from the map switchover between the swivel control maps AL, AR, BL, BR and also from starting the swivel control when the vehicle is standing. However, such an abrupt change in the swiveling angle SWc, which results from the map switchover between the swivel control maps AL, AR, BL, BR and from the initiation of the swivel control when the vehicle is standing, can be avoided also by filtering or smoothing the swiveling angle SWc, or delaying the signal outputted from the steering angle sensor 18 so that the swiveling angle SWc changes only gradually.

Accordingly, the apparatus for automatically adjusting the direction of a light axis of a vehicle headlight according to the second embodiment has a structure including:

a steering angle sensor for detecting a steering angle of a steering wheel of a vehicle;

a vehicle speed sensor for detecting a vehicle speed of the vehicle;

a memory for storing a plurality of swivel control maps each of which defining a relationship between the steering angle and a swiveling angle;

a processing unit for performing a map switchover by which one of the plurality of the control maps is selected depending on the vehicle speed detected by the vehicle speed sensor and the steering angle detected by the steering angle sensor; and an actuator for swiveling, from an initial direction, the light axis of the vehicle headlight by the swiveling angle defined by one of the plurality of control maps selected by the processing unit.

In the apparatus, the processing unit performs one of a smoothing process on the swiveling angle to be outputted to the actuator, a filtering process on the swiveling angle to be outputted to the actuator, and a delaying process on the steering angle detected by the steering angle sensor so that the swiveling angle outputted to the actuator changes gradually when the map switchover is performed by the processing unit.

With this structure, it becomes possible to avoid the driver from feeling awkwardness in the control of the light beam patterns when the vehicle is turning, because the swiveling angle changes only gradually even if the map changeover is performed as a result of a change in the vehicle speed while the vehicle is turning, and so the directions of the light axes of the headlights do not change abruptly while the vehicle is turning.

Figure 8:
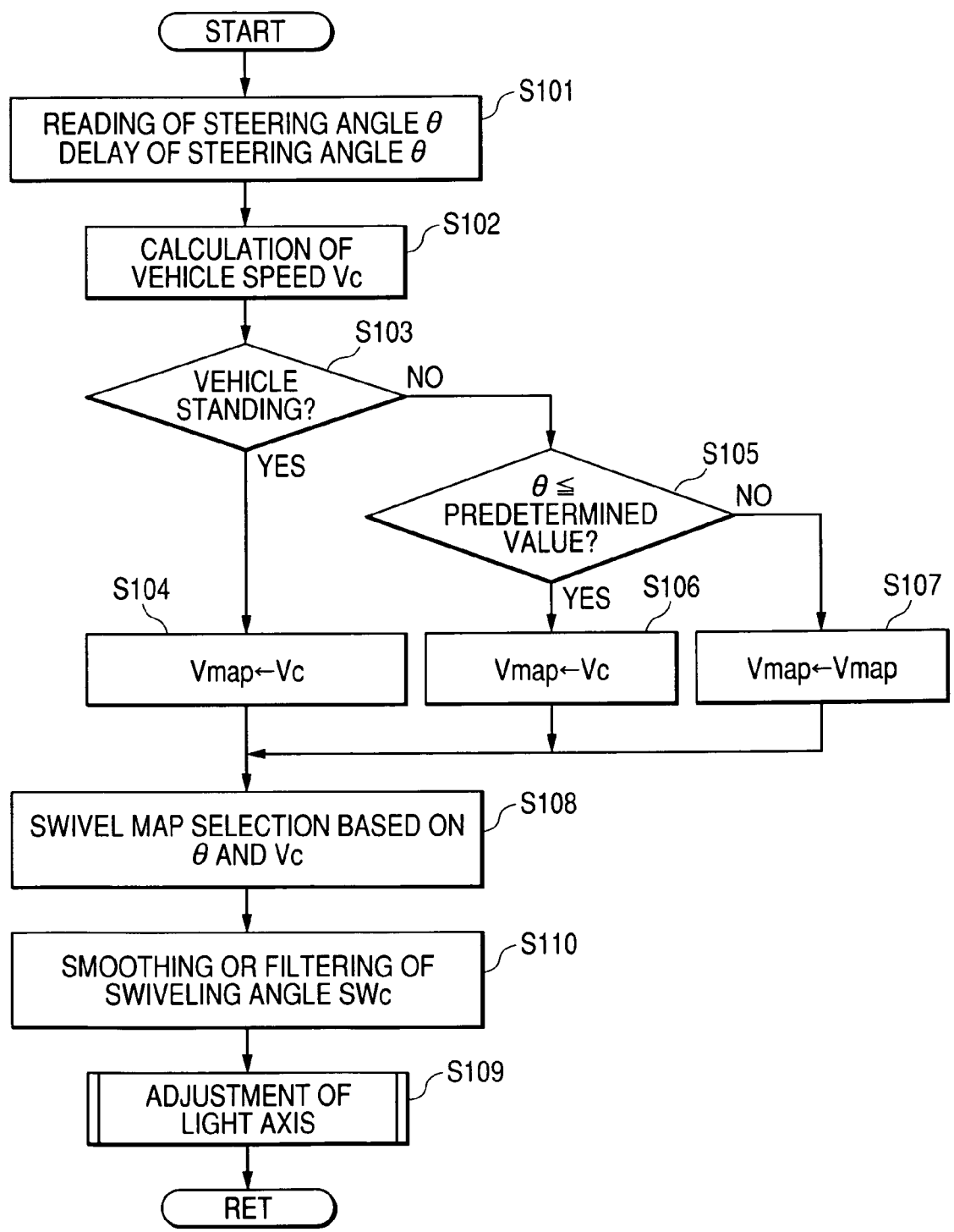
FIG. 8 is a flowchart for explaining the swivel control routine performed by a CPU within an ECU included in the apparatus according to a second embodiment of the invention.

FIG. 8 is a flowchart showing the operation of the second embodiment. As shown in this figure, the operation of the second embodiment is the same as the first embodiment except that, in addition to the steering angle θ reading process, the steering angle θ delaying process is performed at step S101, and that the smoothing or filtering process is performed on the swiveling angle SWc at step S110 after the map selecting process is performed at step S108. However, it is permissible to perform only one of the steering angle θ delaying process and the smoothing or filtering process in the control routine shown in FIG. 8.

Third Embodiment

The abrupt change in the swiveling angle SWc, which results from the map switchover between the swivel control maps AL, AR, BL, BR and from the initiation of the swivel control when the vehicle is standing, can be avoided also by temporarily setting the swiveling angle SWc at a transient value between two different values which the swiveling angle should take before and after the map switchover, respectively. In this case, at the time of performing the map switchover, the swiveling angle SWc is temporarily set at the transient value, and subsequently set at the value defined by the swivel control map to be used after the map switchover. The transient value of the steering control angle SWc may be adjustable.

Accordingly, the apparatus for automatically adjusting the direction of a light axis of a vehicle headlight according to the third embodiment has a structure including:

a steering angle sensor for detecting a steering angle of a steering wheel of a vehicle;

a vehicle speed sensor for detecting a vehicle speed of the vehicle;

a memory for storing a plurality of swivel control maps each of which defining a relationship between the steering angle and a swiveling angle;

a processing unit for performing a map switchover by which one of the plurality of the control maps is selected depending on the vehicle speed detected by the vehicle speed sensor and the steering angle detected by the steering angle sensor; and an actuator for swiveling, from an initial direction, the light axis of the vehicle headlight by the swiveling angle defined by one of the plurality of control maps selected by the processing unit.

In the apparatus, the processing unit, when performing the map switchover to shift the swiveling angle from a first value determined on the basis of one of the plurality of control maps having been used before the map switchover to a second value determined on the basis of one of the plurality of control maps to be used after the map switchover, temporarily sets the swiveling angle at a third value between the first value and the second value.

With this structure, it becomes possible to avoid the driver from feeling awkwardness in the control of the light beam patterns, since the directions of the light axes of the headlights 10L, 10R do not change abruptly even if the map switchover is performed as a result of the change in the vehicle speed Vc while the vehicle is turning.

Figure 9:
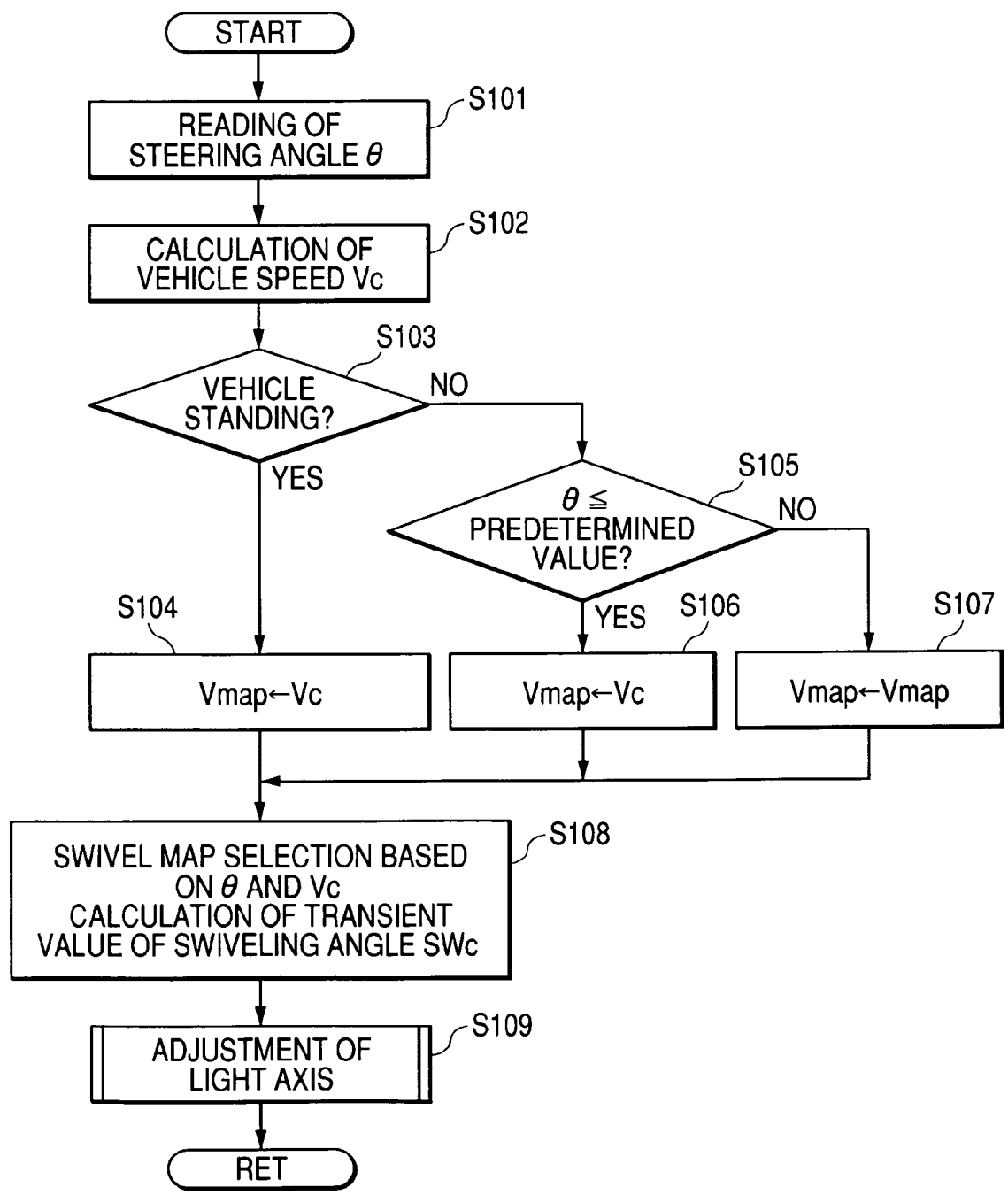
FIG. 9 is a flowchart for explaining the swivel control routine performed by a CPU within an ECU included in the apparatus according to a third embodiment of the invention.

FIG. 9 is a flowchart showing the operation of the third embodiment. As shown in this figure, the operation of the third embodiment is the same as the first embodiment except that, at step 108, the calculation of the transient value is performed in addition to swivel control map selection.

Although the vehicle speed Vc is classified into three levels corresponding to the high-speed regions, low-speed regions, and the standing region for performing the map changeover in the third embodiment, it is possible to classify the vehicle speed into four or more levels by using additional swivel control maps CL, CR, . . . , .

The above explained preferred embodiments are exemplary of the invention of the present application which is described solely by the claims appended below. It should be understood that modifications of the preferred embodiments may be made as would occur to one of skill in the art.

What is claimed is:

1. An apparatus for automatically adjusting a direction of a light axis of a vehicle headlight comprising:

a steering angle sensor for detecting a steering angle of a steering wheel of a vehicle;

a vehicle speed sensor for detecting a vehicle speed of said vehicle;

a memory for storing a plurality of control maps each of which defining a relationship between said steering angle and a swiveling angle;

a processing unit for performing a map switchover by which one of said plurality of said control maps is selected depending on said vehicle speed detected by said vehicle speed sensor and said steering angle detected by said steering angle sensor; and an actuator for swiveling, from an initial direction, said light axis of said vehicle headlight by said swiveling angle defined by one of said plurality of control maps selected by said processing unit;

wherein said processing unit performs said map switchover when said steering angle is changed to outside a predetermined angular range around a neutral angular position of said steering wheel.

2. An apparatus for automatically adjusting a direction of a light axis of a vehicle headlight according to claim 1, wherein said angular range is constant irrespective of said vehicle speed.

3. An apparatus for automatically adjusting a direction of a light axis of a vehicle headlight according to claim 1, wherein said angular range is increased as said vehicle speed increases.

4. An apparatus for automatically adjusting a direction of a light axis of a vehicle headlight according to claim 1, wherein, when said headlight is turned on while said steering angle is beyond said angular range, said processing unit prohibits said actuator from swiveling said light axis of said vehicle headlight until said steering angle is changed to within said angular range.

5. An apparatus for automatically adjusting a direction of a light axis of a vehicle headlight according to claim 1, wherein said angular range overlaps with a dead zone within which said swiveling angle is set at zero.

6. An apparatus for automatically adjusting a direction of a light axis of a vehicle headlight according to claim 1, wherein said angular range overlaps with a range within which said swiveling angle is set at values smaller than a predetermined threshold.

7. An apparatus for automatically adjusting a direction of a light axis of a vehicle headlight according to claim 1, wherein said angular range is symmetrical with respect to said neutral angular position.

8. An apparatus for automatically adjusting a direction of a light axis of a vehicle headlight according to claim 1, wherein said angular range is asymmetrical with respect to said neutral angular position.

9. An apparatus for automatically adjusting a direction of a light axis of a vehicle headlight comprising:

a steering angle sensor for detecting a steering angle of a steering wheel of a vehicle;

a vehicle speed sensor for detecting a vehicle speed of said vehicle;

a memory for storing a plurality of control maps each of which defining a relationship between said steering angle and a swiveling angle;

a processing unit for performing a map switchover by which one of said plurality of said control maps is selected depending on said vehicle speed detected by said vehicle speed sensor and said steering angle detected by said steering angle sensor; and an actuator for swiveling, from an initial direction, said light axis of said vehicle headlight by said swiveling angle defined by one of said plurality of control maps selected by said processing unit;

wherein said processing unit performs one of a smoothing process on said swiveling angle to be outputted to said actuator, a filtering process on said swiveling angle to be outputted to said actuator, and a delaying process on said steering angle detected by said steering angle sensor so that said swiveling angle outputted to said actuator changes gradually when said map switchover is performed by said processing unit.

10. An apparatus for automatically adjusting a direction of a light axis of a vehicle headlight comprising:

a steering angle sensor for detecting a steering angle of a steering wheel of a vehicle;

a vehicle speed sensor for detecting a vehicle speed of said vehicle;

a memory for storing a plurality of control maps each of which defining a relationship between said steering angle and a swiveling angle;

a processing unit for performing a map switchover by which one of said plurality of said control maps is selected depending on said vehicle speed detected by said vehicle speed sensor and said steering angle detected by said steering angle sensor; and an actuator for swiveling, from an initial direction, said light axis of said vehicle headlight by said swiveling angle defined by one of said plurality of control maps selected by said processing unit;

wherein said processing unit, when performing said map switchover to shift said swiveling angle from a first value determined on the basis of one of said plurality of control maps having been used before said map switchover to a second value determined on the basis of one of said plurality of control maps to be used after said map switchover, temporarily sets said swiveling angle at a third value between said first value and said second value.

* * * * *